US012715364B2

(12) United States Patent
Muramatsu et al.

(10) Patent No.: US 12,715,364 B2
(45) Date of Patent: Aug. 25, 2026

(54) VIDEO DISPLAY DEVICE FOR SYNTHESIZING A BIRD'S EYE VIEW VIDEO

(71) Applicants: TOYOTA JIDOSHA KABUSHIKI KAISHA, Aichi (JP); DENSO CORPORATION, Aichi (JP)

(72) Inventors: Masaya Muramatsu, Toyota (JP); Yuki Yamamoto, Toyota (JP); Kohei Maejima, Nagakute (JP)

(73) Assignees: TOYOTA JIDOSHA KABUSHIKI KAISHA, Aichi (JP); DENSO CORPORATION, Aichi (JP)

(*) Notice: Subject to any disclaimer, the term of this patent is extended or adjusted under 35 U.S.C. 154(b) by 0 days.

(21) Appl. No.: 18/923,677

(22) Filed: Oct. 23, 2024

(65) Prior Publication Data

US 2025/0135999 A1 May 1, 2025

(30) Foreign Application Priority Data

Oct. 25, 2023 (JP) ................................ 2023-183388

(51) Int. Cl.
*B60R 1/27* (2022.01)

(52) U.S. Cl.
CPC .......... *B60R 1/27* (2022.01); *B60R 2300/102* (2013.01); *B60R 2300/105* (2013.01);
(Continued)

(58) Field of Classification Search
CPC ................ B60R 1/27; B60R 2300/102; B60R 2300/105; B60R 2300/301; B60R 2300/302; B60R 2300/607; B60R 2300/8033; B60R 2300/8093; B60R 2300/70; B60R 2300/304; B60R 1/22; B60R 2300/60; H04N 7/181; H04N 23/80; H04N 5/265; H04N 5/91; H04N 23/63; H04N 23/57; B60K 35/22; B60K 35/28; B60K 35/81
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |

(Continued)

FOREIGN PATENT DOCUMENTS

| | | | |
|---|---|---|---|
| DE | 112015000763 | T5 | 11/2016 |
| JP | 2007-104373 | A | 4/2007 |

(Continued)

*Primary Examiner* — James M Pontius
(74) *Attorney, Agent, or Firm* — HAUPTMAN HAM, LLP

(57) ABSTRACT

A video display device includes: a camera configured to capture video of surroundings of a vehicle; a storage unit configured to store the video captured by the camera as past video; a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected; and a display unit configured to display the bird's-eye view video output by the control unit.

6 Claims, 14 Drawing Sheets

(52) U.S. Cl.
CPC ... *B60R 2300/301* (2013.01); *B60R 2300/302* (2013.01); *B60R 2300/607* (2013.01); *B60R 2300/8033* (2013.01); *B60R 2300/8093* (2013.01)

(56) References Cited

U.S. PATENT DOCUMENTS

| | | | | |
|---|---|---|---|---|
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2013/0300872 | A1 | 11/2013 | Park | |
| 2019/0001968 | A1 | 1/2019 | Yorifuji et al. | |
| 2019/0230309 | A1* | 7/2019 | Asayama | G06T 7/50 |
| 2019/0344828 | A1 | 11/2019 | Omori et al. | |
| 2019/0389488 | A1 | 12/2019 | Yamada et al. | |
| 2024/0022679 | A1* | 1/2024 | Okabe | B60R 1/00 |

FOREIGN PATENT DOCUMENTS

| | | | |
|---|---|---|---|
| JP | 2015-170915 | A | 9/2015 |
| JP | 2018-207286 | A | 12/2018 |

* cited by examiner 2
1
VEHICLE
10
101
FRONT CAMERA
102
RIGHT-SIDE CAMERA
103
LEFT-SIDE CAMERA
104
REAR CAMERA
11
STORAGE UNIT
14
CONTROL UNIT
15
DISPLAY UNIT
12
EXTERNAL SENSOR
13
INTERNAL SENSOR 30
2

30
2

30
2

15
GR4
OB2
OB30
AR5

15
GR5
OB30
OB2
AR6
AR5

15
GR6
OB30
AR6
OB2
AR5

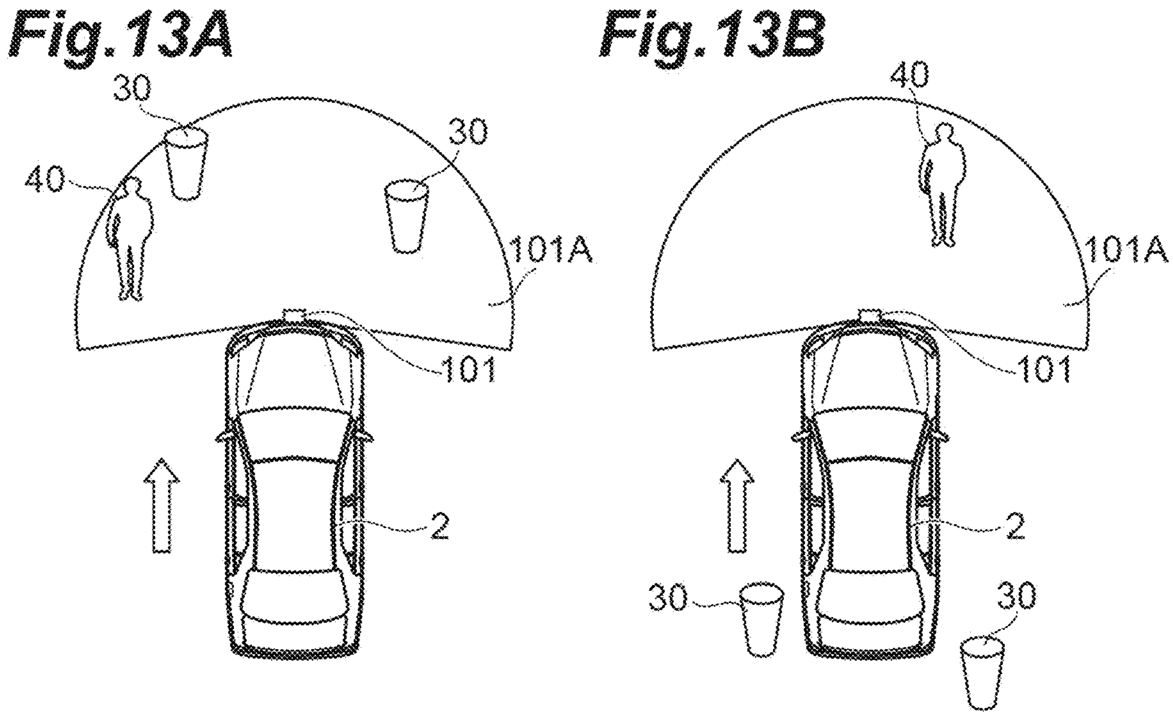
Fig.13A
30
30
40
101A
101
2
Fig.13B
40
101A
101
2
30
30
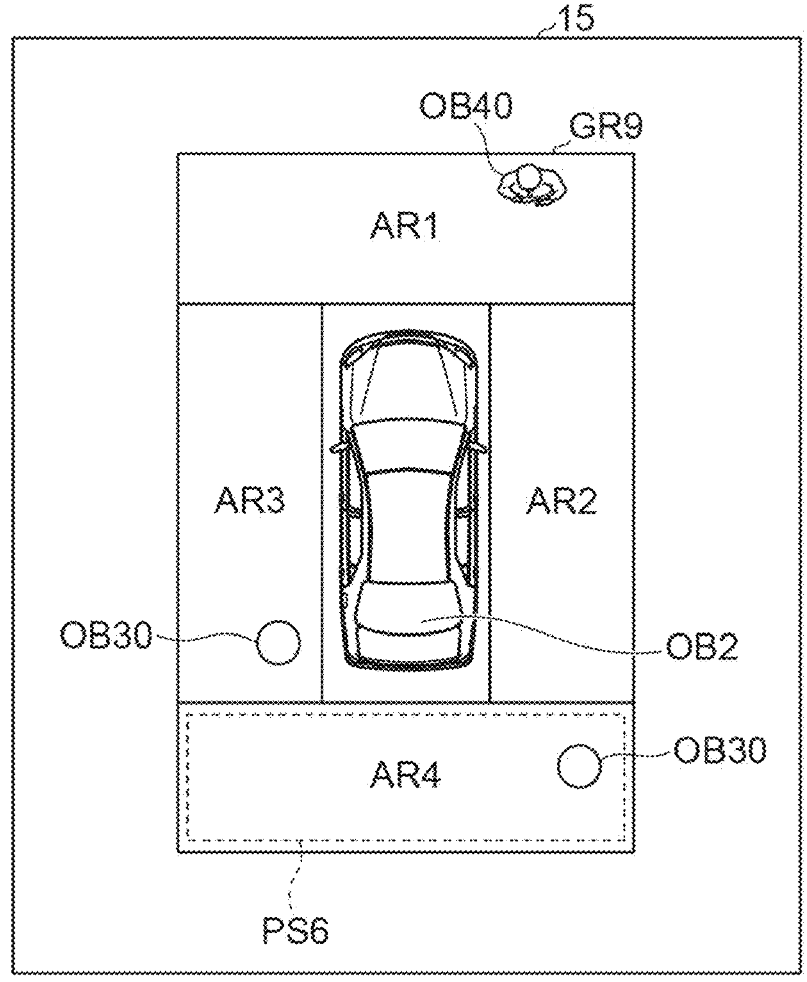
Fig.13C
15
OB40
GR9
AR1
AR3
AR2
OB30
OB2
AR4
OB30
PS6

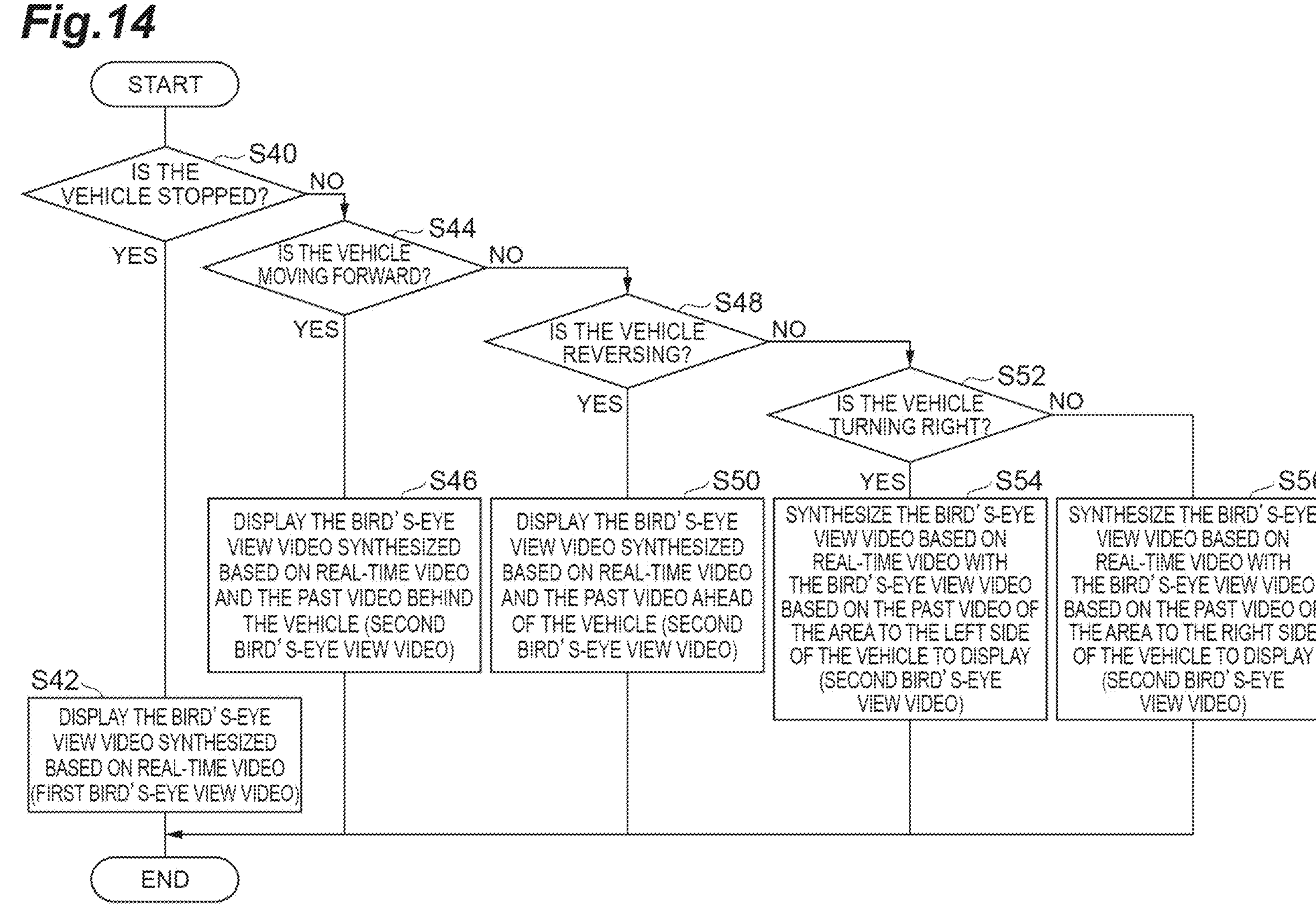
Fig.14
START
S40
IS THE VEHICLE STOPPED?
YES
NO
S44
IS THE VEHICLE MOVING FORWARD?
YES
NO
S48
IS THE VEHICLE REVERSING?
YES
NO
S52
IS THE VEHICLE TURNING RIGHT?
YES
NO
S46
DISPLAY THE BIRD' S-EYE VIEW VIDEO SYNTHESIZED BASED ON REAL-TIME VIDEO AND THE PAST VIDEO BEHIND THE VEHICLE (SECOND BIRD' S-EYE VIEW VIDEO)
S50
DISPLAY THE BIRD' S-EYE VIEW VIDEO SYNTHESIZED BASED ON REAL-TIME VIDEO AND THE PAST VIDEO AHEAD OF THE VEHICLE (SECOND BIRD' S-EYE VIEW VIDEO)
S54
SYNTHESIZE THE BIRD' S-EYE VIEW VIDEO BASED ON REAL-TIME VIDEO WITH THE BIRD' S-EYE VIEW VIDEO BASED ON THE PAST VIDEO OF THE AREA TO THE LEFT SIDE OF THE VEHICLE TO DISPLAY (SECOND BIRD' S-EYE VIEW VIDEO)
S56
SYNTHESIZE THE BIRD' S-EYE VIEW VIDEO BASED ON REAL-TIME VIDEO WITH THE BIRD' S-EYE VIEW VIDEO BASED ON THE PAST VIDEO OF THE AREA TO THE RIGHT SIDE OF THE VEHICLE TO DISPLAY (SECOND BIRD' S-EYE VIEW VIDEO)
S42
DISPLAY THE BIRD' S-EYE VIEW VIDEO SYNTHESIZED BASED ON REAL-TIME VIDEO (FIRST BIRD' S-EYE VIEW VIDEO)
END

VIDEO DISPLAY DEVICE FOR SYNTHESIZING A BIRD'S EYE VIEW VIDEO

CROSS-REFERENCE TO RELATED APPLICATION

This application is based on Japanese Patent Application No. 2023-183388 filed with Japan Patent Office on Oct. 25, 2023, the entire contents of which are hereby incorporated by reference.

TECHNICAL FIELD

The present disclosure relates to a video display device.

BACKGROUND

Japanese Patent Application Laid-Open No. 2007-104373 discloses a video display device for a vehicle. This device converts image signals of a plurality of cameras that image the surroundings of the vehicle into image signals when looking down from a viewpoint above the vehicle, and synthesizes the converted image signals. As a result, the bird's-eye view image looking down from the viewpoint above the vehicle is displayed. Then, when it is determined that a display position of the object presenting around the vehicle overlaps the boundary of the image to be synthesized, the apparatus changes the boundary of the image to be synthesized so that the object does not overlap the boundary of the image to be synthesized. As a result, the display in which the object becomes discontinuous or collapses is suppressed.

SUMMARY

The apparatus described in Japanese Patent Application Laid-Open No. 2007-104373 may not be able to sufficiently suppress disappearance or duplication of an object. For example, when there are many objects, the boundary is frequently changed, so that the disappearance or the duplication of the object may occur depending on the computational capability. Here, it can be considered that the disappearance or the duplication of the object is suppressed by synthesizing the video captured in the past. However, the past video cannot respond to real-time motion around the vehicle. The present disclosure provides a technique capable of appropriately displaying a bird's-eye view video of a vehicle.

According to an aspect of the present disclosure, there is provided a video display device including: a camera configured to capture video of surroundings of a vehicle; a storage unit configured to store the video captured by the camera as past video; a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected; and a display unit configured to display the bird's-eye view video output by the control unit.

In the video display device, video to be synthesized is selected from the real-time video and the past video in accordance with the situation around the vehicle or the traveling state of the vehicle, and the bird's-eye view video in which the selected video is synthesized is output. The video display device reflects the past video in the composition of the bird's-eye view video in accordance with the situation around the vehicle or the traveling state of the vehicle, thereby making it possible to display the bird's-eye view video in which disappearance or duplication of an object is sufficiently suppressed as compared with the case where the real-time video is always reflected in the composition of the bird's-eye view video, and to display the bird's-eye view video corresponding to a change in the surrounding environment as compared with the case where the past video is always reflected in the composition of the bird's-eye view video. Therefore, the video display device can appropriately display the bird's-eye view video of the vehicle.

In one embodiment, the control unit may output any one of first bird's-eye view video obtained by synthesizing the real-time video and second bird's-eye view video obtained by synthesizing at least the past video based on the situation around the vehicle, or may output the second bird's-eye view video based on the traveling state of the vehicle. The video display device may display a first bird's-eye view video or a second bird's-eye view video based on the situation around the vehicle or the traveling state of the vehicle.

In one embodiment, the control unit may output the first bird's-eye view video when a moving object presents within the imaging range of the camera, and may output the second bird's-eye view video obtained by synthesizing the past video when the moving object does not present within the imaging range of the camera. In this case, the video display device may output the first bird's-eye view video that prioritizes coping with changes in the surrounding environment when a moving object is present, and may output the second bird's-eye view video that prioritizes resolving object loss or resolving object duplication when a moving object is not present.

In one embodiment, the video display device may include a plurality of cameras including the camera, and the storage unit may store past video captured by the plurality of cameras, and the control unit may generate the first bird's-eye view video by synthesizing real-time video captured by the plurality of cameras, and may generate the second bird's-eye view video by synthesizing past video or synthesizing past video and real-time video. In this case, the video display device may display the bird's-eye view video with high accuracy by synthesizing the images of the plurality of cameras.

In one embodiment, the control unit may output the second bird's-eye view video, which is obtained by synthesizing the bird's-eye view video of the stationary object based on the past video with the first bird's-eye view video, in a case where the stationary object presents within the imaging ranges of the plurality of cameras. In this case, the video display device can suppress disappearance or duplication of the stationary object while appropriately displaying the moving object in real-time.

In one embodiment, the control unit may output the second bird's-eye view video, which is obtained by synthesizing the bird's-eye view video of the stationary object based on the past video with the first bird's-eye view video, in a case where the stationary object presents within the imaging range of the plurality of cameras and a display position of the stationary object overlaps with the synthesis boundary of the bird's-eye view video. In this case, the video display device can suppress disappearance or duplication of the stationary object while appropriately displaying the surrounding environment in real-time.

In one embodiment, when the traveling state of the vehicle is moving state, the control unit may generate an area ahead of the travel direction of the vehicle in the second bird's-eye view video based on the real-time video representing ahead of the travel direction of the vehicle, and may generate an area behind the travel direction of the vehicle in the second bird's-eye view video based on the past video representing behind the travel direction of the vehicle. In this case, the video display device can respond to an environmental change by displaying the travel direction to which the most attention should be paid using real-time video, and can suppress the disappearance or duplication of an object by displaying the rearward direction, which is of lower importance compared to the travel direction, using past video.

According to the present disclosure, there is provided a technique capable of appropriately displaying a bird's-eye view video of a vehicle.

BRIEF DESCRIPTION OF DRAWINGS

FIGS. 13A and 13B are examples of a surrounding environment of a vehicle.

FIG. 13C is an example of a bird's-eye view video corresponding to the surrounding environment shown in FIG. 13B.

FIG. 14 is a flowchart illustrating an operation of the video display device according to the modified example.

DETAILED DESCRIPTION

Hereinafter, embodiments of the present disclosure will be described with reference to drawings.

[Configuration of Vehicle]

Figure 1:
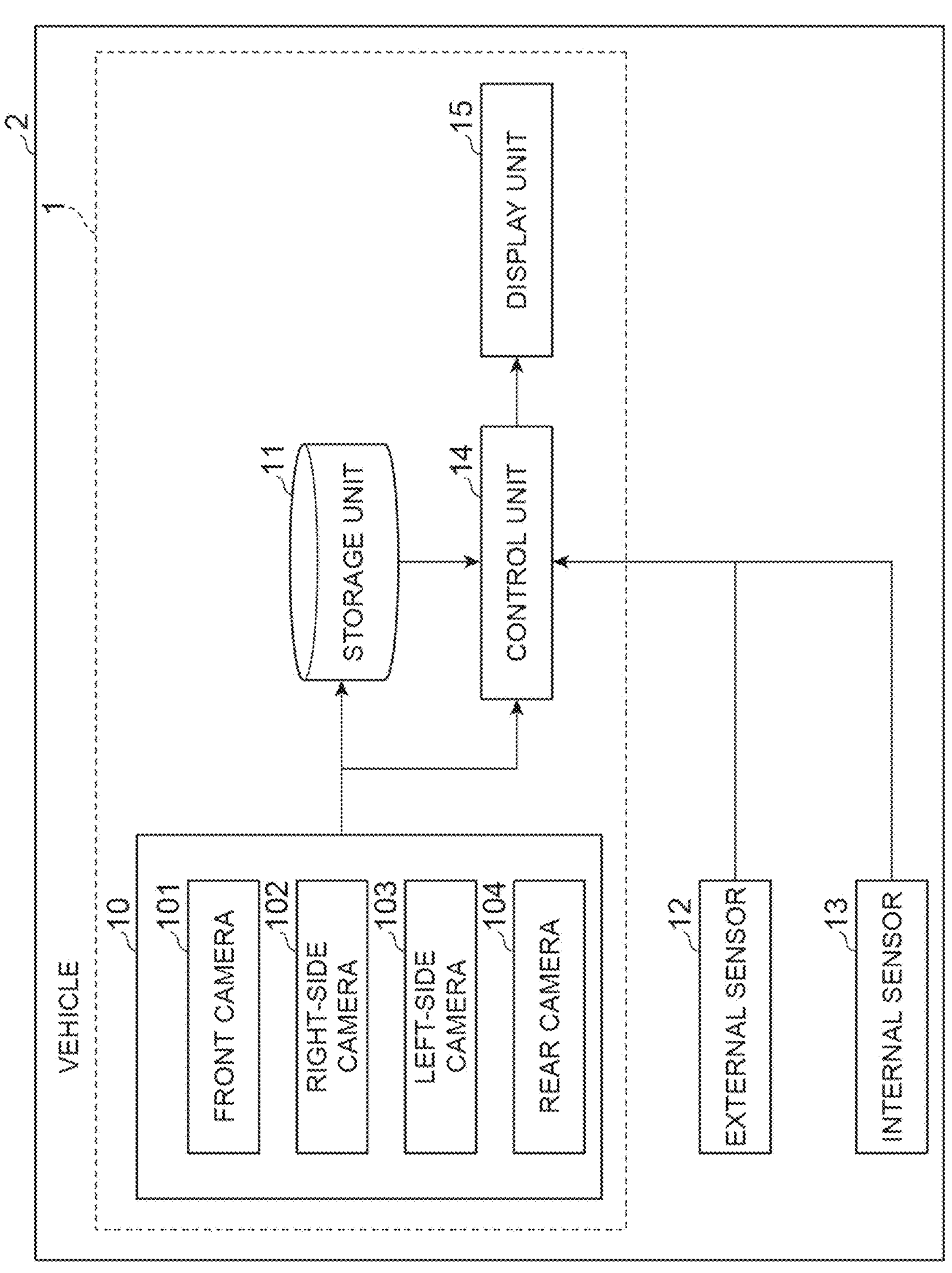
FIG. 1 is a block diagram illustrating an example of a configuration of a vehicle including a video display device according to an embodiment.

FIG. 1 is a block diagram illustrating an example of a configuration of a vehicle including a video display device according to an embodiment. As shown in FIG. 1, a video display device 1 is mounted on a vehicle 2 as an example. The vehicle 2 may be a vehicle driven by a driver, or may be an autonomous driving vehicle.

The vehicle 2 includes a plurality of cameras 10, a storage unit 11, an external sensor 12, an internal sensor 13, a control unit 14 and a display unit 15. The video display device 1 includes the plurality of cameras 10, the storage unit 11, the control unit 14, and the display unit 15.

Figure 2:
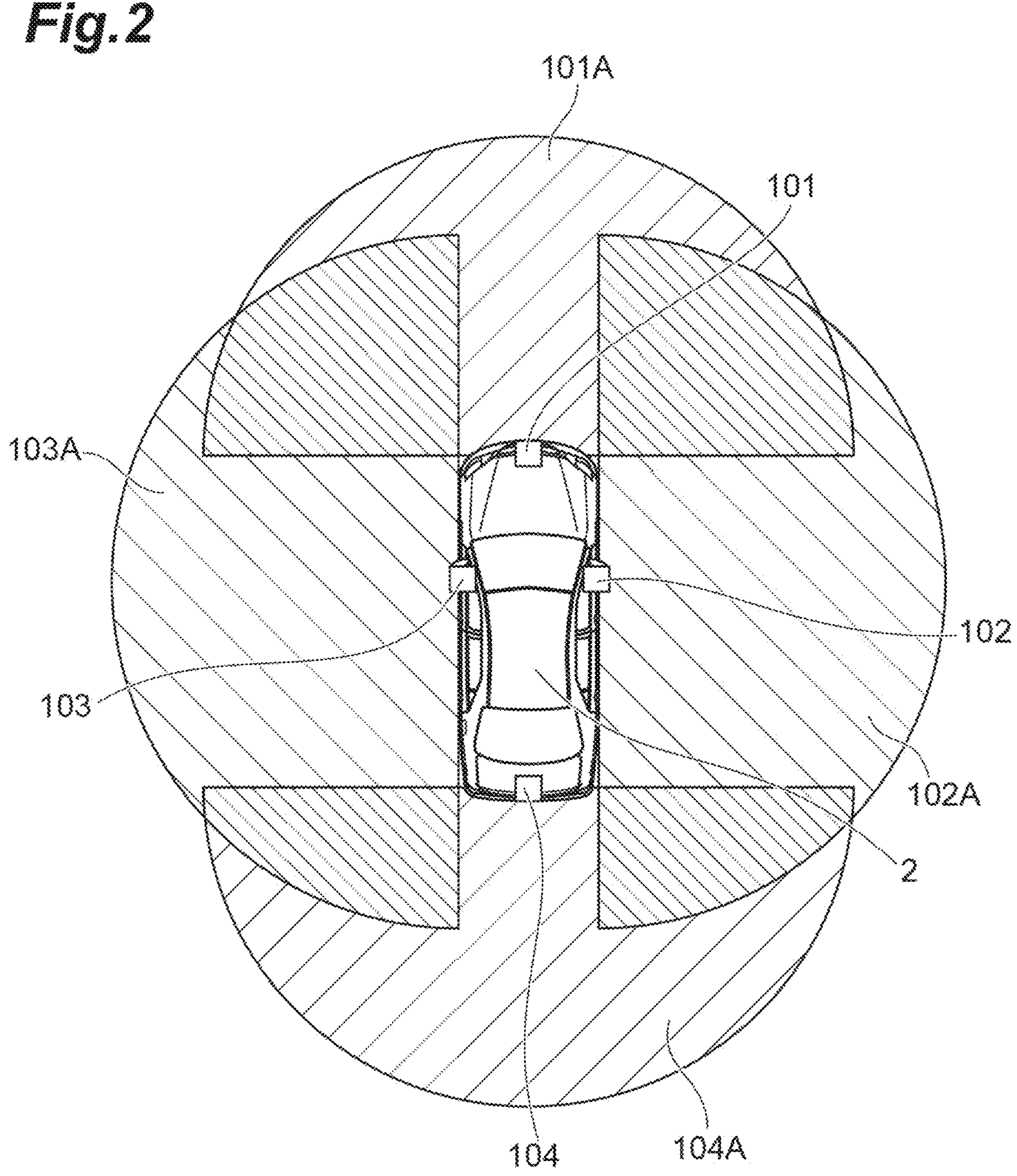
FIG. 2 illustrates an example of imaging regions of a plurality of sensors provided in a vehicle 2.

The plurality of cameras 10 is a camera group that images the periphery of the vehicle 2. Examples of the plurality of cameras 10 include a front camera 101, a right-side camera 102, a left-side camera 103, and a rear camera 104. FIG. 2 illustrates an example of imaging regions of a plurality of sensors provided in the vehicle 2. As shown in FIG. 2, the front camera 101 is provided on a front bumper or the like, and images a front range 101A of the vehicle 2. The right-side camera 102 is provided on a door mirror or the like and captures an image of a right-side range 102A of the vehicle 2. The left-side camera 103 is provided on a door mirror or the like and captures an image of a left-side range 103A of the vehicle 2. The rear camera 104 is provided on a rear bumper or the like, and images a rear range 104A of the vehicle 2.

The storage unit 11 stores, for each camera, the past video captured by the plurality of cameras 10. The past video means recorded real-time video, and includes moving images and still images. The real-time video is an image captured at a current time by the plurality of cameras 10, and includes moving images and still images. The storage unit 11 is, for example, a storage medium such as a read only memory (ROM), a random-access memory (RAM), or a hard disk drive (HDD).

The external sensor 12 is a sensor that detects the surrounding environment of the vehicle 2. The external sensor 12 is, for example, a radar sensor. The radar sensor is detection equipment that detects an object around the vehicle using radio waves (for example, millimeter waves) or light. The radar sensor includes, for example, a millimeter wave radar or a light detection and ranging (LiDAR).

The internal sensor 13 is a sensor that detects the traveling state of the vehicle 2. The internal sensor 13 may include, for example, a GPS receiver, a vehicle speed sensor, an acceleration sensor, and a yaw rate sensor.

The control unit 14 has a function of controlling the video display device. The control unit 14 includes, for example, an electronic control unit (ECU). The ECU includes a central processing unit (CPU), a read-only memory (ROM), a random-access memory (RAM), and a controller area network (CAN). This is an electronic control unit having a communication circuit and the like. The control unit 14 generates a bird's-eye view video by synthesizing images captured by the plurality of cameras 10. The bird's-eye view video is an image of the vehicle 2 viewed from a viewpoint above the vehicle 2, and includes a moving image and a still image.

Figure 3:
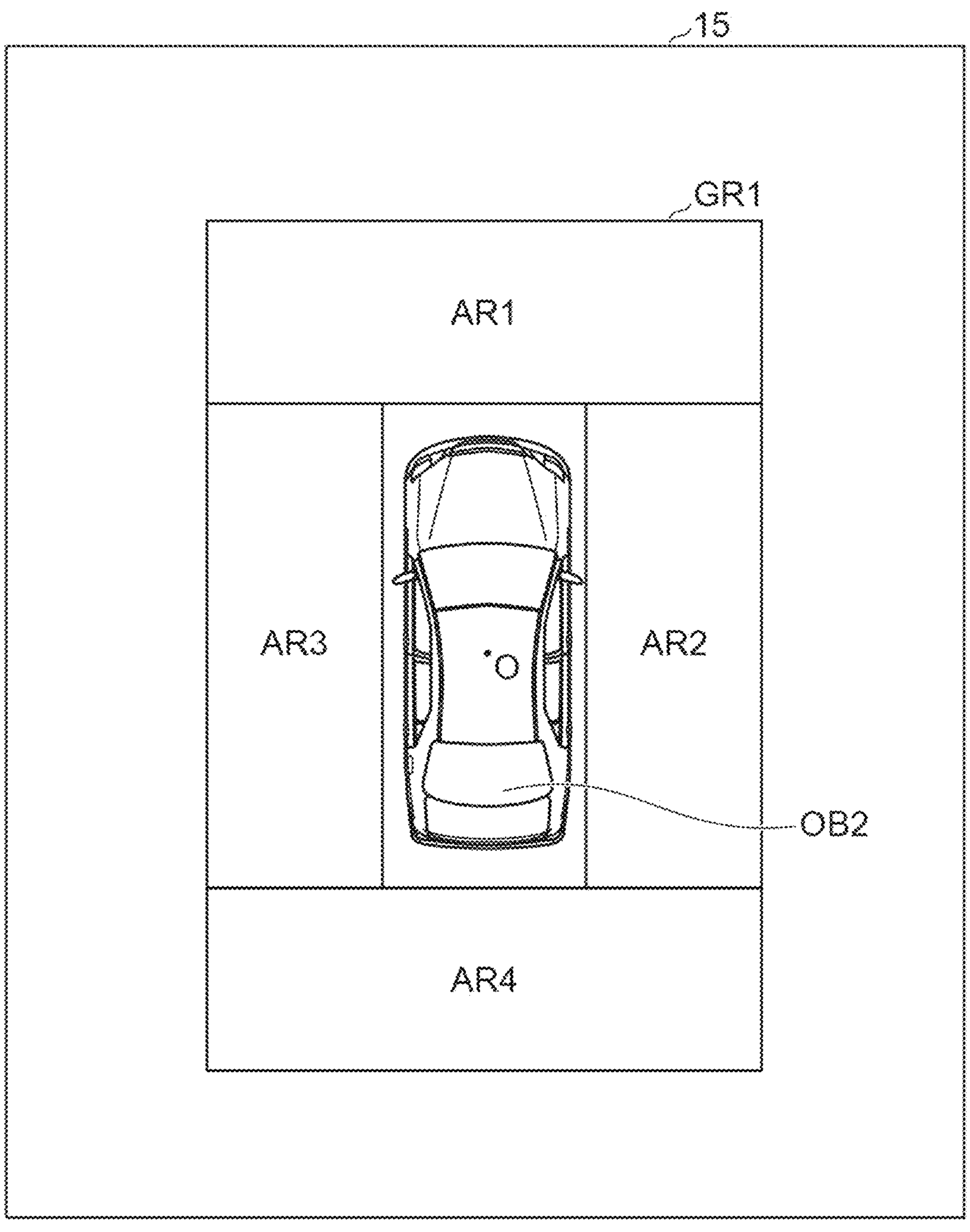
FIG. 3 shows an example of a bird's-eye view video displayed on the display unit.

The display unit 15 displays the bird's-eye view video output by the control unit 14. The display unit 15 is, for example, a display device. FIG. 3 shows an example of a bird's-eye view video displayed on the display unit. As shown in FIG. 3, the display unit 15 displays a bird's-eye view video GR1 produced by the control unit 14. The control unit 14 produces the bird's-eye view video GR1 with a vehicle object OB2 corresponding to the vehicle 2. The control unit 14 inputs image signals from the plurality of cameras 10 and performs image processing to generate bird's-eye view video looking down at the vehicle 2 from a directly upward viewpoint. The viewpoint conversion may be performed based on an arrangement position and an imaging direction of each of the plurality of cameras 10 based on a reference point O of the vehicle 2. The image processing for the viewpoint conversion may be executed by software or may be executed by hardware circuits.

The control unit 14 displays a front area AR1 of the vehicle 2 using an image signal captured by the front camera 101. The control unit 14 displays a right-side area AR2 of the vehicle 2 using an image signal captured by the right-side camera 102. The control unit 14 displays a left-side area AR3 of the vehicle 2 using an image signal captured by the left-side camera 103. The control unit 14 displays a rear area AR4 of the vehicle 2 using an image signal captured by the rear camera 104. Thus, the bird's-eye view video GR1 is generated.

The control unit 14 selects an image to be synthesized from real-time video captured by the plurality of cameras 10 and past video stored in the storage unit 11. The video to be synthesized is selected based on the situation around the vehicle 2. For example, the control unit 14 determines whether there is a moving object in imaging ranges of the plurality of cameras 10 based on detection results of the plurality of cameras 10 and/or the external sensor 12. In the case of using a result of imaging by the plurality of cameras 10, the control unit 14 detects a moving object based on a motion vector between frames. When the control unit 14 uses the external sensor 12 detection result, the moving object is detected based on the temporal displacement of the distance to the detected object.

The control unit 14 selects real-time video as the synthesis target video when there are moving objects within the imaging range of the plurality of cameras 10. Accordingly, the control unit 14 outputs a bird's-eye view video (first bird's-eye view video) obtained by synthesizing the real-time video. The first bird's-eye view video is the bird's-eye view video composed of video at the current time captured by the plurality of cameras 10. When a moving object does not present in the imaging ranges of the plurality of cameras 10, the control unit 14 selects the past video as an image serving as a synthesis target. As a result, the control unit 14 outputs the bird's-eye view video (second bird's-eye view video) obtained by synthesizing the past video stored in the storage unit 11. As described above, for example, the control unit 14 outputs any one of the first bird's-eye view video obtained by synthesizing the real-time video and the second bird's-eye view video obtained by synthesizing the past video in accordance with the situation around the vehicle 2.

Figure 4A:
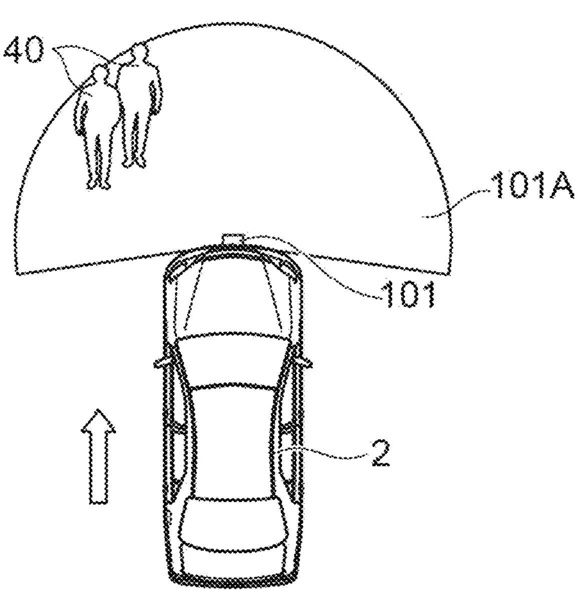
FIG. 4A is an example of a surrounding environment of a vehicle.
Figure 4B:
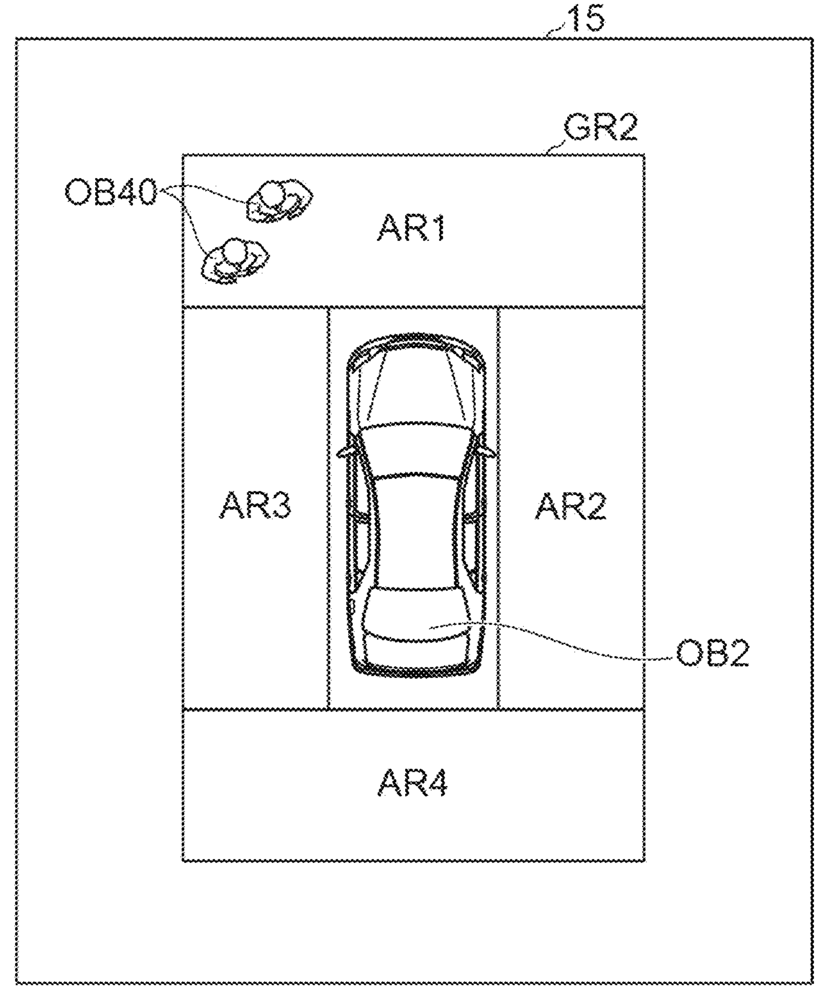
FIG. 4B is an example of a bird's-eye view video corresponding to the surrounding environment shown in FIG. 4A.

FIG. 4A is an example of a surrounding environment of a vehicle, and FIG. 4B is an example of a bird's-eye view video corresponding to the surrounding environment shown in FIG. 4A. As shown in FIG. 4A, it is assumed that the vehicle 2 is moving forward and a moving object 40, which is a pedestrian, is present ahead of the vehicle 2. The vehicle 2 determines that the moving object 40 is present in the front range 101A of the front camera 101 based on the detection result of the front camera 101 and/or the external sensor 12. In this case, the control unit 14 selects the real-time video as the synthesis target video. The control unit 14 outputs a first bird's-eye view video GR2 obtained by synthesizing the real-time video. As shown in FIG. 4B, the display unit 15 displays the first bird's-eye view video GR2 output by the control unit 14. The first bird's-eye view video GR2 includes a moving object image OB40 corresponding to the moving object 40. Thus, the driver can grasp the periphery of the vehicle 2 in real-time.

Figure 5A:
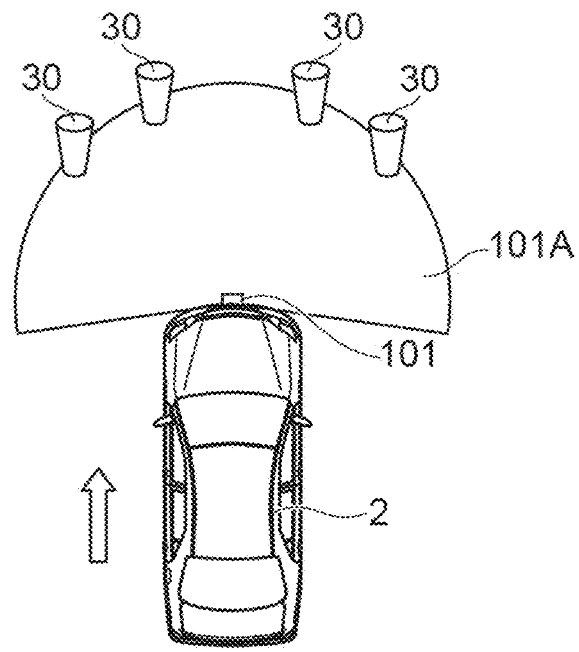
FIG. 5A illustrates an example of a surrounding environment of a vehicle.
Figure 5B:
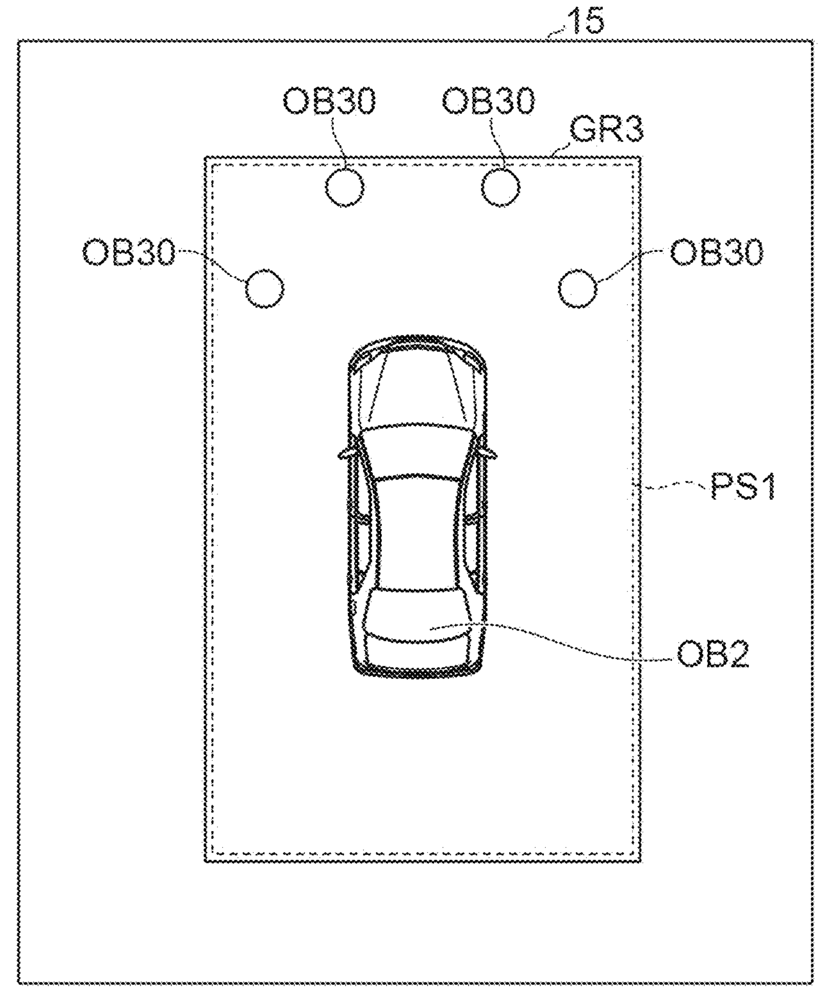
FIG. 5B illustrates an example of a bird's-eye view video corresponding to the surrounding environment illustrated in FIG. 5A.

FIG. 5A illustrates an example of a surrounding environment of a vehicle, and FIG. 5B illustrates an example of a bird's-eye view video corresponding to the surrounding environment illustrated in FIG. 5A. As shown in FIG. 5A, it is assumed that the vehicle 2 is moving forward and a stationary object 30 such as a pole is present ahead of the vehicle 2. The vehicle 2 determines that the stationary object 30 is present in the front range 101A of the front camera 101 based on the detection result of the front camera 101 and/or the external sensor 12. In this case, the control unit 14 selects past video as the video to be synthesized. The control unit 14 outputs a second bird's-eye view video GR3 obtained by synthesizing the past video. As shown in FIG. 5B, the display unit 15 displays the second bird's-eye view video GR3 output by the control unit 14. The second bird's-eye view video GR3 includes a stationary object image OB30 corresponding to the stationary object 30. In the second bird's-eye view video GR3, since all areas PS1 of the video are created based on the past video, there are no boundaries due to compositing, and object loss or duplication is avoided.

[Operation of Video Display Device]

Figure 6:
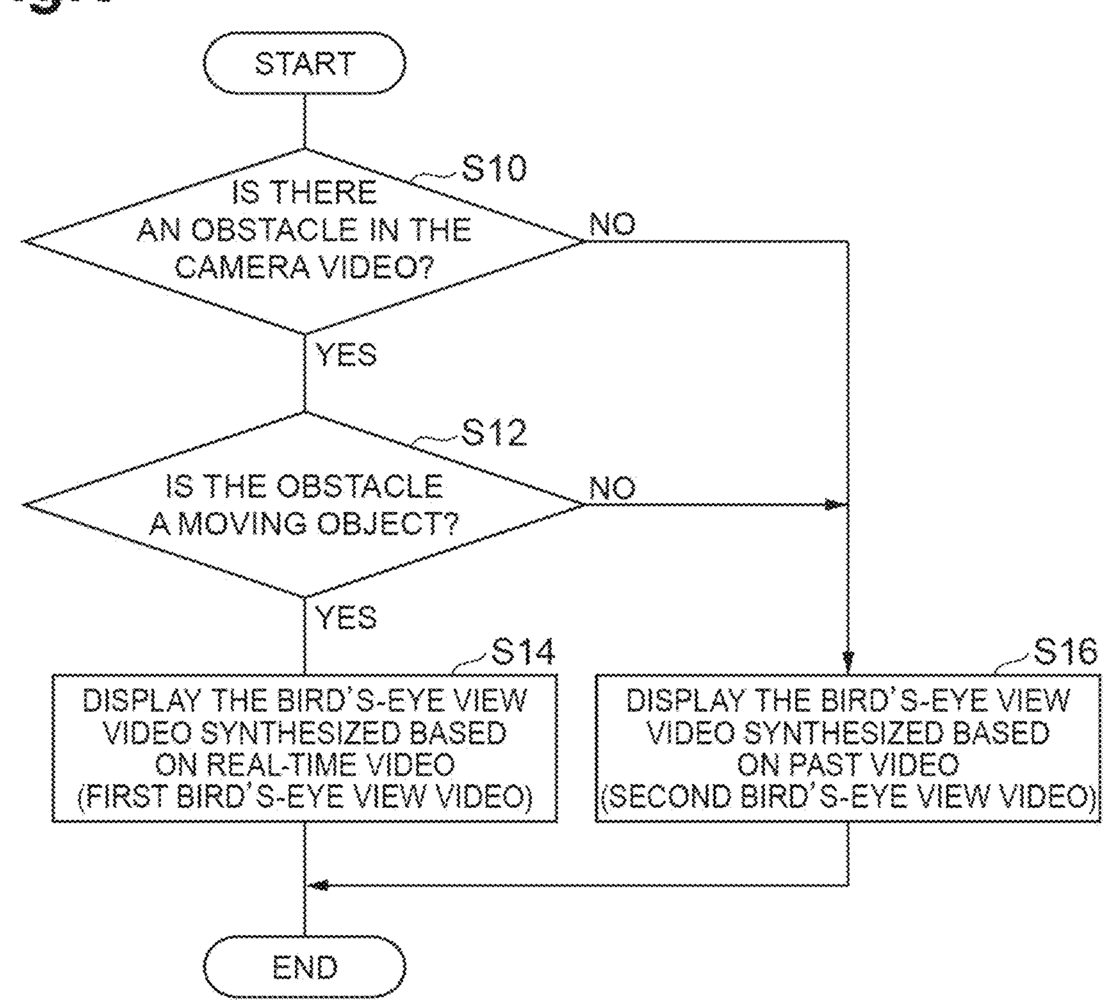
FIG. 6 is a flowchart showing the operation of the video display device.

FIG. 6 is a flowchart showing the operation of the video display device. The flowchart illustrated in FIG. 6 is executed by the control unit 14, for example, at a timing when a driver operation is received.

As illustrated in FIG. 6, the control unit 14 determines whether or not obstacle presents in the camera video at step S10. The control unit 14 determines the presence or absence of obstacle in the vicinity of the vehicle 2 based on the detection results of the plurality of cameras 10 and/or the external sensor 12.

When it is determined that the obstacle presents in the camera video (step S10: YES), the control unit 14 determines whether or not the obstacle is a moving object in step S12. The control unit 14 determines whether the obstacle determined in step S10 is a moving object based on the detection results of the plurality of cameras 10 and/or the external sensor 12.

When it is determined that the object is a moving object (step S12: YES), the control unit 14 selects the real-time video as the video serving as the synthesis target in step S14. Then, the control unit 14 displays the first bird's-eye view video on the display unit 15 (see FIG. 4B).

When it is determined that the obstacle does not present in the camera video (step S10: NO) or when it is determined that the obstacle is not a moving object (step S12: NO), the control unit 14 selects the past video as the video serving as the synthesis target in step S16. Then, the control unit 14 displays the second bird's-eye view video on the display unit 15 (see FIG. 5B). When step S14 or step S16 has ended, the flowchart ends. The flowchart is repeatedly executed until a driver operation for termination is received.

SUMMARY OF EMBODIMENTS

In the video display device 1, an image to be synthesized is selected from the real-time video and the past video based on the situation around the vehicle 2, and the bird's-eye view video in which the selected image is synthesized is output. By reflecting the past video in the composition of the bird's-eye view video in accordance with the situation around the vehicle 2, the video display device 1 can display the bird's-eye view video in which the disappearance or duplication of objects is sufficiently suppressed compared to a case where the real-time video is always reflected in the composition of the bird's-eye view video, and can display the bird's-eye view video corresponding to changes in the surrounding environment compared to a case where the past video is always reflected in the composition of the bird's-eye view video. Thus, the video display device 1 can properly display the bird's-eye view video of the vehicle 2.

Although the exemplary embodiments have been described above, various omissions, substitutions, and changes may be made without being limited to the above-described exemplary embodiments.

Modified Example

[Single Camera Configuration]

Figure 7:
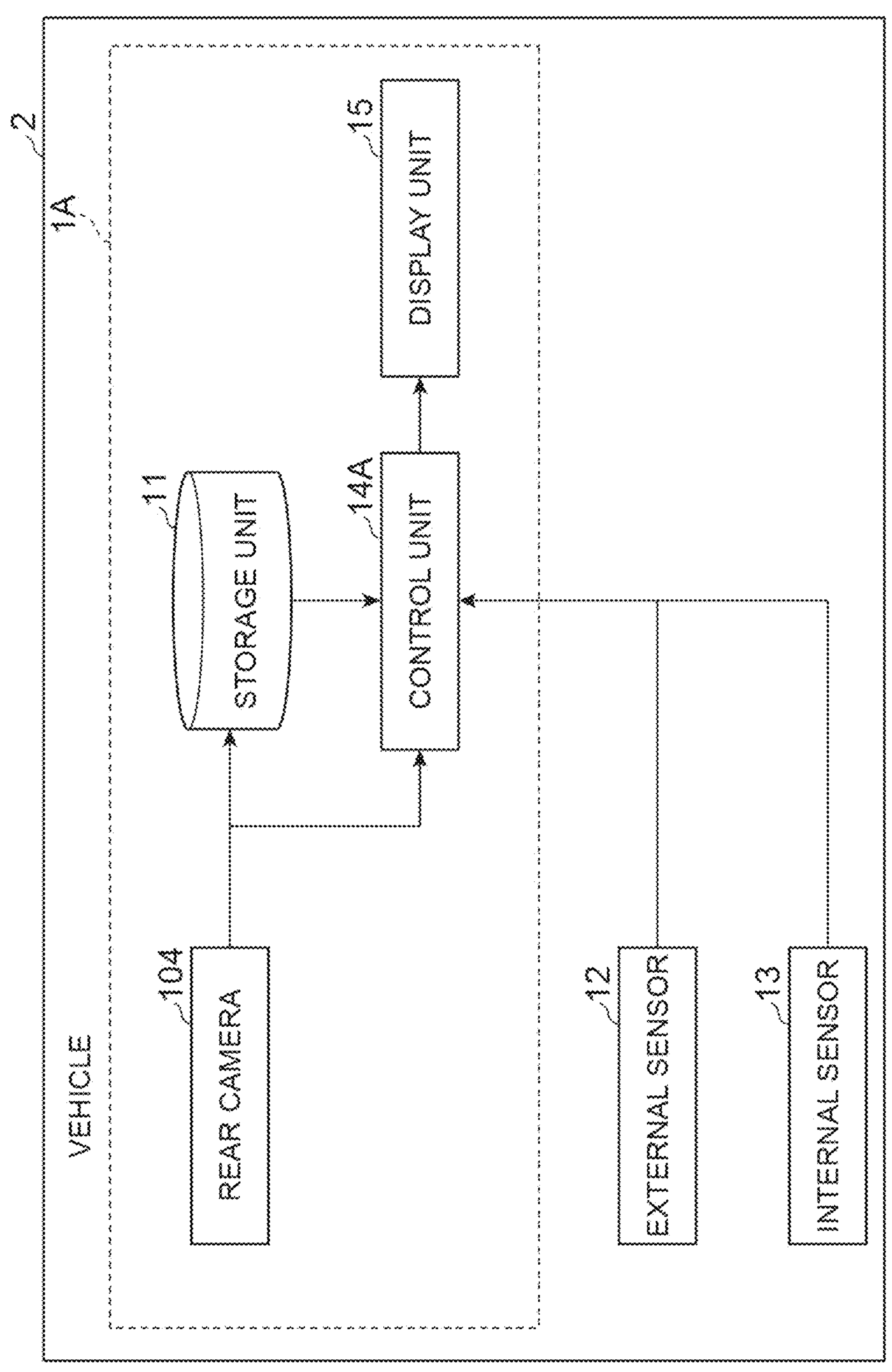
FIG. 7 is a block diagram illustrating an example of a configuration of a vehicle including a video display device according to the modified example.

FIG. 7 is a block diagram illustrating an example of a configuration of a vehicle including a video display device according to the modified example. A video display device 1A shown in FIG. 7 is different from the video display device 1 in that it does not include the plurality of cameras 10 and includes only the rear camera 104, and in that a part of the operation of a control unit 14A is different from that of the control unit 14, and the others are the same. Hereinafter, differences will be mainly described, and redundant description will not be repeated.

The control unit 14A first generates bird's-eye view video using only the real-time video of the rear camera 104. When the control unit 14A obtains the past video due to the movement of the vehicle 2, the control unit 14A synthesizes the real-time video and the past video stored in the storage unit 11 to generate bird's-eye view video.

Figures 8A, 8B, 8C, 8D, 8E, 8F:
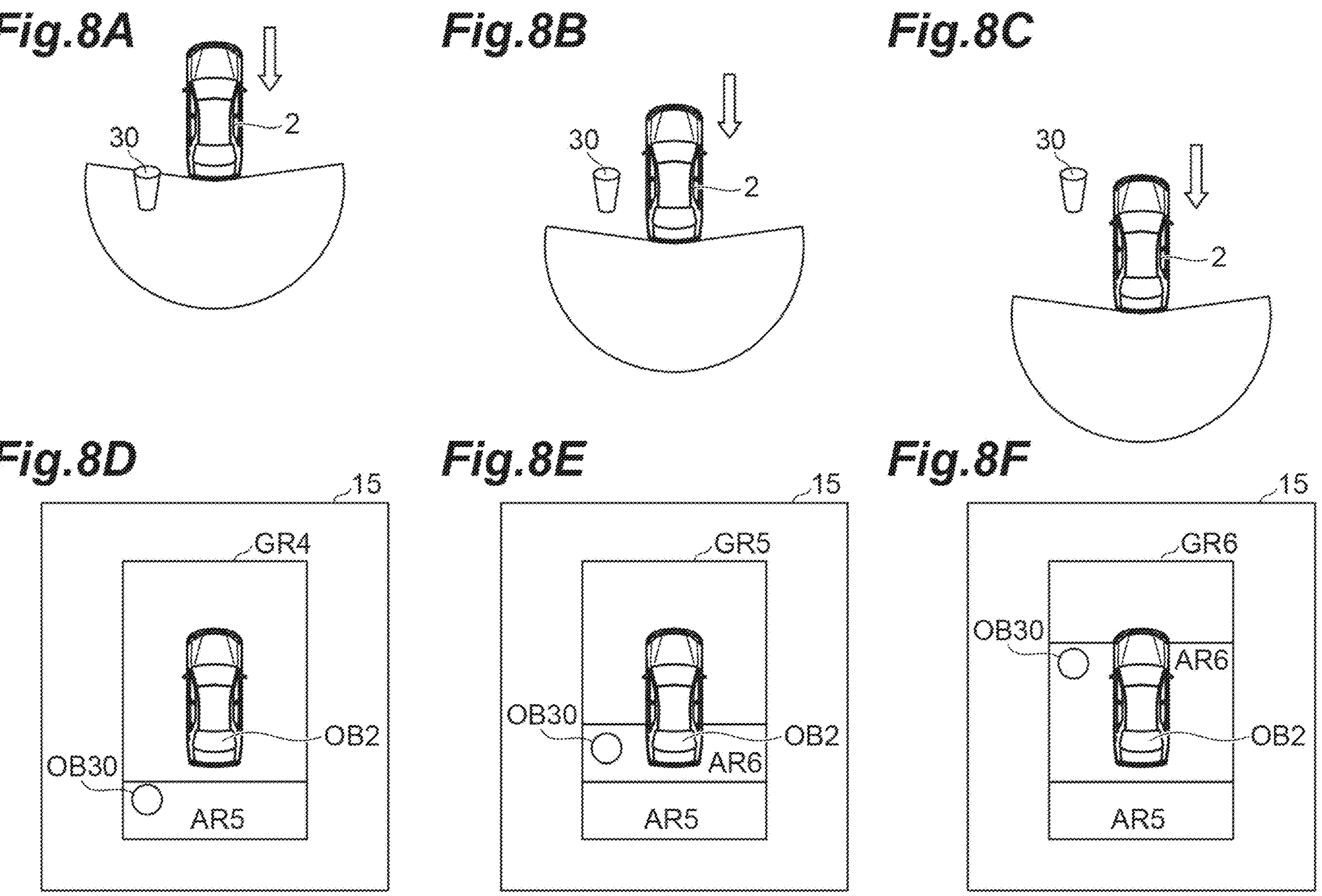
FIGS. 8A, 8B, and 8C are examples of the surrounding environment of the vehicle.
FIGS. 8D, 8E, and 8F are examples of the bird's-eye view video corresponding to the surrounding environment shown in FIGS. 8A, 8B, and 8C.

FIGS. 8A, 8B, and 8C are examples of the surrounding environment of the vehicle, and FIGS. 8D, 8E, and 8F are examples of the bird's-eye view video corresponding to the surrounding environment shown in FIGS. 8A, 8B, and 8C. As shown in the order of FIGS. 8A, 8B, and 8C, it is assumed that the vehicle 2 moves so as to move backward. The control unit 14A generates a synthesized first bird's-eye view video GR4 using only real-time video, as shown in FIG. 8D, when the vehicle 2 is in the position of FIG. 8A. In the first bird's-eye view video GR4, the video is displayed only on an area AR5 corresponding to the imaging range of the rear camera 104, and the other area is, for example, blank. The stationary object image OB30 corresponding to the stationary object 30 is displayed on the area AR5.

Subsequently, when the vehicle 2 is in the position of FIG. 8B, the control unit 14A generates a second bird's-eye view video GR5 in which the real-time video and the past video are synthesized, as shown in FIG. 8E. In the second bird's-eye view video GR5, video is displayed only in the area AR5 corresponding to the imaging range of the rear camera 104 and an area AR6 corresponding to past images, and the other areas are, for example, blank. Subsequently, when the vehicle 2 is at the position of FIG. 8C, the control unit 14A generates a second bird's-eye view video GR6 in which the real-time video and the past video are synthesized, as shown in FIG. 8F. In the second bird's-eye view video GR6, video is displayed only in the area AR5 corresponding to the imaging range of the rear camera 104 and the area AR6 corresponding to past image, and the other area is, for example, blank. Since the second bird's-eye view video GR6 has more past video available than the second bird's-eye view video GR5, the area AR6 is longer.

Similarly to the control unit 14, the control unit 14A displays the first bird's-eye view video (for example, FIG. 8D) when a moving object is detected, and displays the second bird's-eye view video (for example, FIGS. 8E and 8F) when a moving object is not detected. As a result, the video display device 1A increases the displayable range by displaying the past video when a moving object is not detected, thereby increasing the amount of information to be reported, and when a moving object is detected, accurate information can be provided to the driver by not displaying the past video that cannot respond to the intrusion of the moving object.

[Example of Applying Past Video Only to Stationary Objects]

Figure 9A:
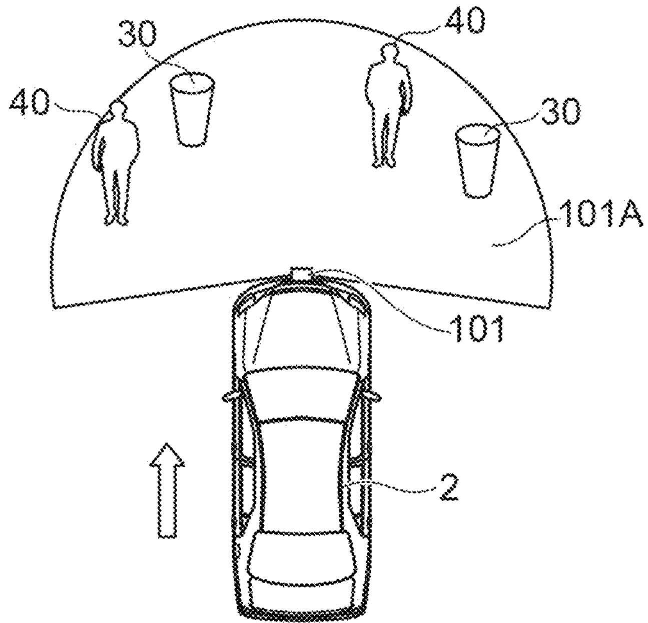
FIG. 9A is an example of a surrounding environment of a vehicle.
Figure 9B:
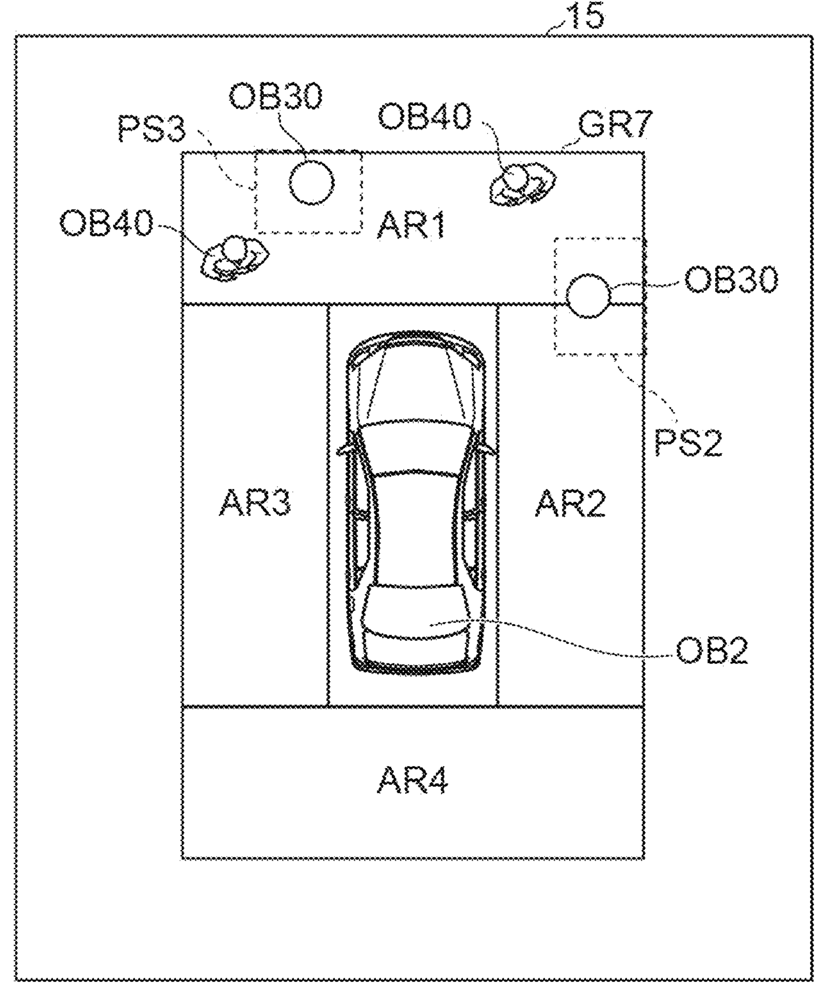
FIG. 9B is an example of a bird's-eye view video corresponding to the surrounding environment shown in FIG. 9A.

FIG. 9A is an example of a surrounding environment of a vehicle, and FIG. 9B is an example of a bird's-eye view video corresponding to the surrounding environment shown in FIG. 9A. As shown in FIG. 9A, it is assumed that the vehicle 2 is moving forward, and the stationary object 30 such as a pole and the moving object 40 which is a pedestrian present ahead of the vehicle 2. The vehicle 2 determines that the stationary object 30 and the moving object 40 are present in the front range 101A of the front camera 101 based on the detection result of the front camera 101 and/or the external sensor 12. In this case, the control unit 14 selects real-time video and past video as the video to be synthesized. The control unit 14 generates the first bird's-eye view video obtained by synthesizing the real-time video, and synthesizes the bird's-eye view video regarding the stationary object 30 based on the past video with respect to the first bird's-eye view video.

First, the control unit 14 determines whether there is any past video of the stationary object 30 based on the position of the stationary object 30. The control unit 14 may determine whether the past video of the stationary object 30 presents by matching the past video with the real-time video. When it is determined that there is a past video of the stationary object 30, the control unit 14 generates a bird's-eye view video of the stationary object 30. The control unit 14 may cut the video region of the certain range in which the stationary object 30 appears and generate the bird's-eye view video from the cut video region, or may generate the entire bird's-eye view video from the past video and then cut the video region of the certain range in which the stationary object 30 appears. The generated bird's-eye view video regarding the stationary object 30 is overwritten to overlap the image of the stationary object 30 on the first bird's-eye view video generated from the real-time video. As a result, a second bird's-eye view video GR7 shown in FIG. 9B is generated. Areas PS2 and PS3 including the stationary object image OB30 are regions generated based on the past video.

Figure 10:
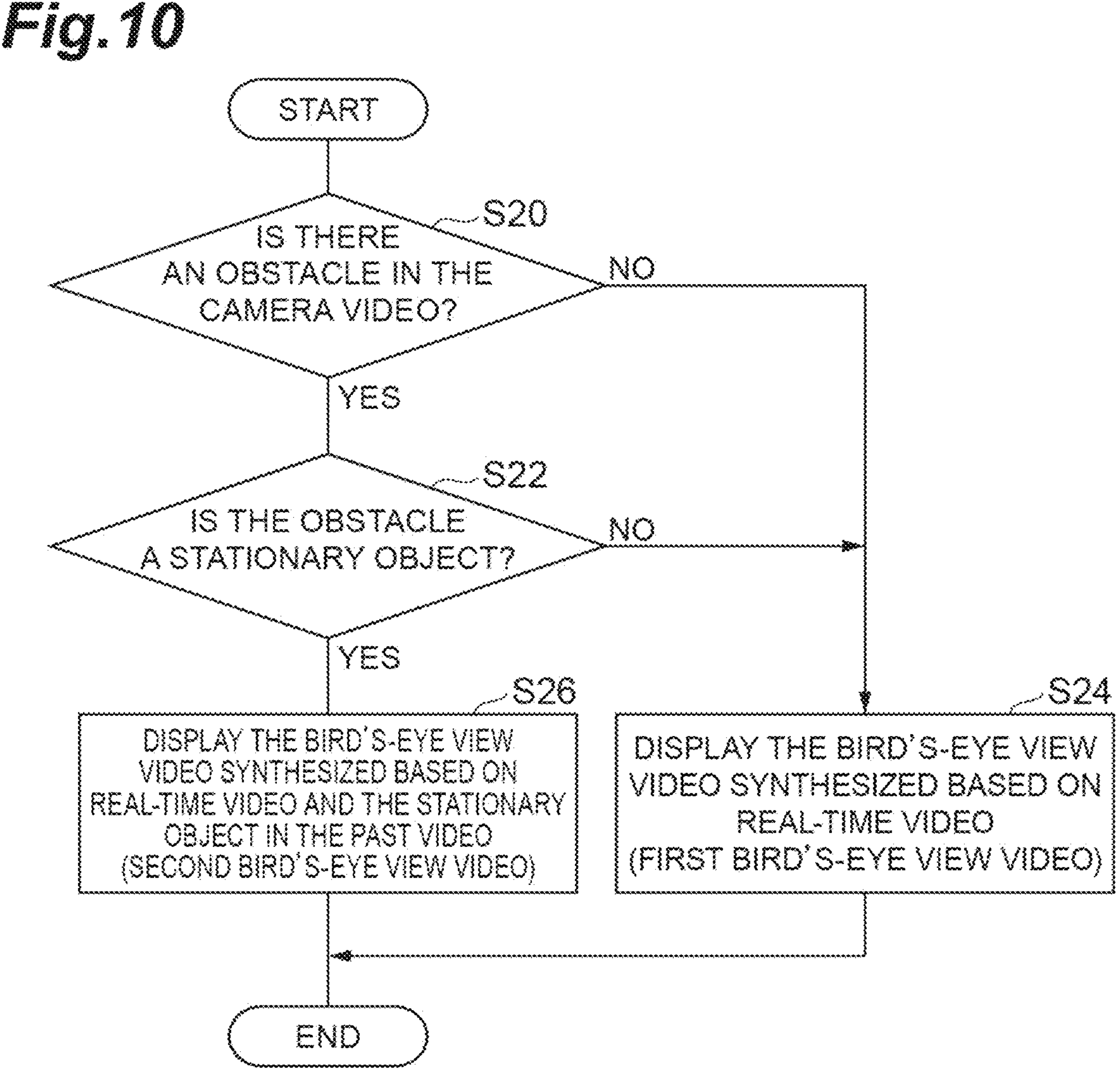
FIG. 10 is a flowchart illustrating an operation of the video display device according to the modified example.

FIG. 10 is a flowchart illustrating an operation of the video display device according to the modified example. The flowchart illustrated in FIG. 10 is executed by the control unit 14, for example, at a timing when a driver operation is received.

As illustrated in FIG. 10, the control unit 14 determines whether or not obstacle is present in camera video in step S20. This determination is the same as step S10.

When it is determined that an obstacle presents in the camera video (step S20: YES), the control unit 14 determines whether or not the obstacle is a stationary object in step S22. The control unit 14 determines whether the object determined in step S20 is a stationary object based on the detection results of the plurality of cameras 10 and/or the external sensor 12.

When it is determined that the obstacle does not present in the camera video (step S20: NO) or when it is determined that the obstacle is not the stationary object (step S22: NO), the control unit 14 selects the real-time video as the video serving as the synthesis target in step S24. The control unit 14 then causes the display unit 15 to display the first bird's-eye view video.

When it is determined that the object is a stationary object (step S22: YES), the control unit 14 selects the real-time video and the past video as videos to be synthesized in step S26. Then, the control unit 14 generates the stationary object image OB30 based on the past video while creating the first bird's-eye view video based on the real-time video. The control unit 14 displays, in the display unit 15, the second bird's-eye view video GR7 in which the stationary object image OB30 is synthesized with first bird's-eye view video (see FIG. 9B). When step S24 or step S26 is completed, the flowchart ends. The flowchart is repeatedly executed until a driver operation for termination is received.

As described above, the video display device can suppress disappearance or duplication of a stationary object while appropriately displaying a moving object in real-time. Note that the video display device may use the presence or absence of a moving object as an additional condition for generating the second bird's-eye view video. That is, the video display device may be configured to generate the second bird's-eye view video when both the moving object and the stationary object are present within the imaging range of the plurality of cameras 10. In addition, when it is determined that the obstacle does not present in the camera video (step S20: NO), the second bird's-eye view video based on only the past video may be displayed.

[Example of Applying Past Video Only to Stationary Objects Satisfying Conditions]

Figure 11A:
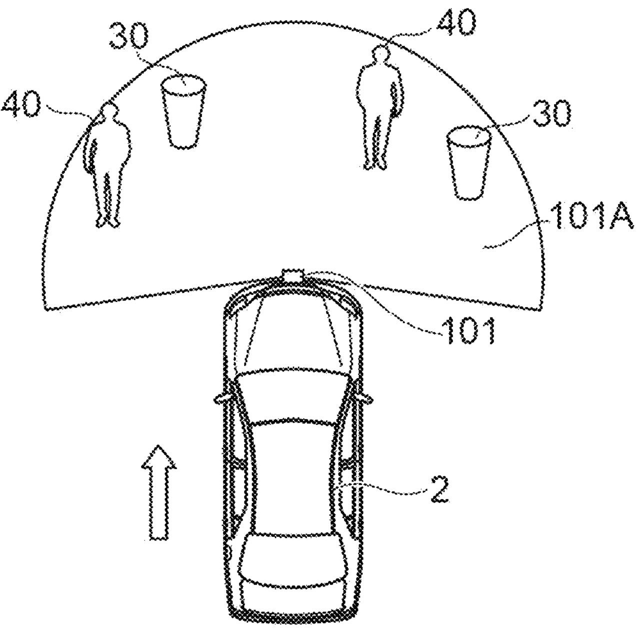
FIG. 11A is an example of a surrounding environment of a vehicle.
Figure 11B:
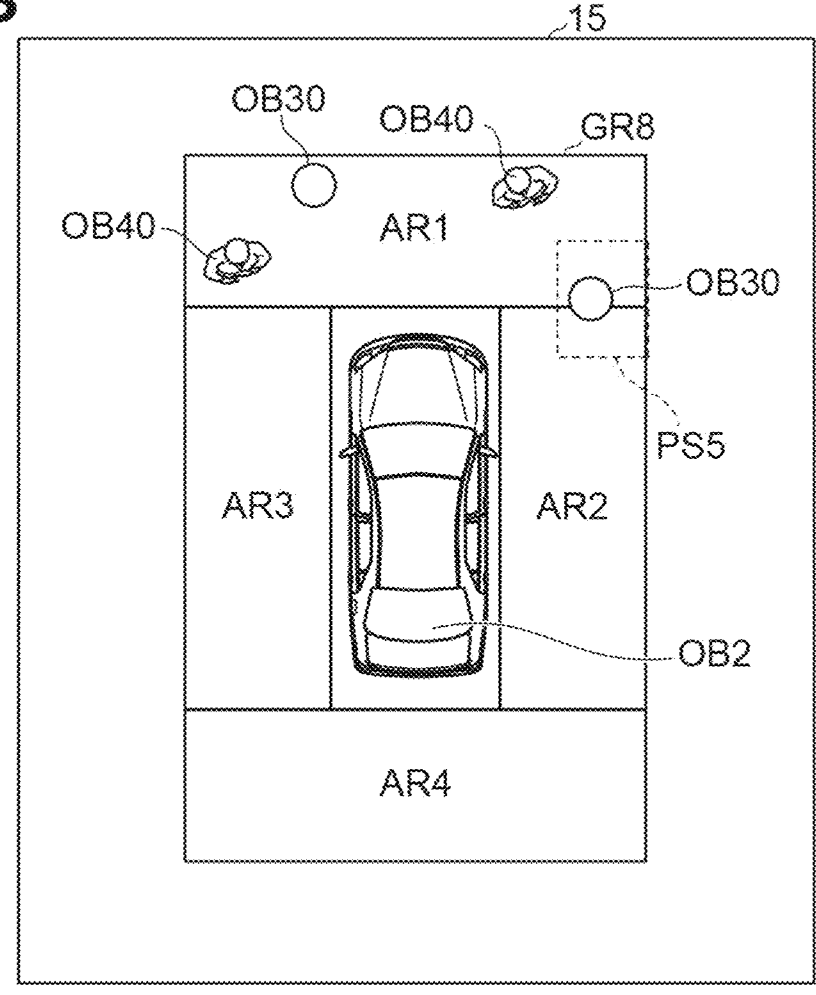
FIG. 11B is an example of a bird's-eye view video corresponding to the surrounding environment shown in FIG. 11A.

FIG. 11A is an example of a surrounding environment of a vehicle, and FIG. 11B is an example of a bird's-eye view video corresponding to the surrounding environment shown in FIG. 11A. As shown in FIG. 11A, it is assumed that the vehicle 2 is moving forward, and the stationary object 30 such as a pole and the moving object 40 which is a pedestrian present ahead of the vehicle 2. The vehicle 2 determines that the stationary object 30 and the moving object 40 are present in the front range 101A of the front camera 101 based on the detection result of the front camera 101 and/or the external sensor 12. In this case, the control unit 14 selects real-time video and past video as the video to be synthesized. The control unit 14 generates the first bird's-eye view video obtained by synthesizing the real-time video, and synthesizes the bird's-eye view video of the stationary object 30 based on the past video with respect to the first bird's-eye view video.

First, the control unit 14 determines whether there is any past video of the stationary object 30 based on the position of the stationary object 30. The control unit 14 may determine whether the past video of the stationary object 30 presents by matching the past video with the real-time video. When it is determined that the past video of the stationary object 30 is present, the control unit 14 determines whether or not the display position of the stationary object 30 overlaps the synthesis boundary of the bird's-eye view video. The synthesis boundary is a boundary between the front area AR1, the right-side area AR2, the left-side area AR3, and the rear area AR4. When the stationary object 30 overlaps with the synthesis boundary, the control unit 14 generates the bird's-eye view video of the stationary object 30. The control unit 14 may cut the video region within a certain range in which the stationary object 30 appears and generate the bird's-eye view video from the cut video region, or may generate the entire bird's-eye view video from the past video and then cut the video region within a certain range in which the stationary object 30 appears. The generated bird's-eye view video regarding the stationary object 30 is overwritten to overlap the image of the stationary object 30 on the first bird's-eye view video generated from the real-time video. Thus, a second bird's-eye view video GR8 illustrated in FIG. 11B is generated. An area PS5 including the stationary object image OB30 overlapping with the synthesis boundary is a region generated based on the past video.

Figure 12:
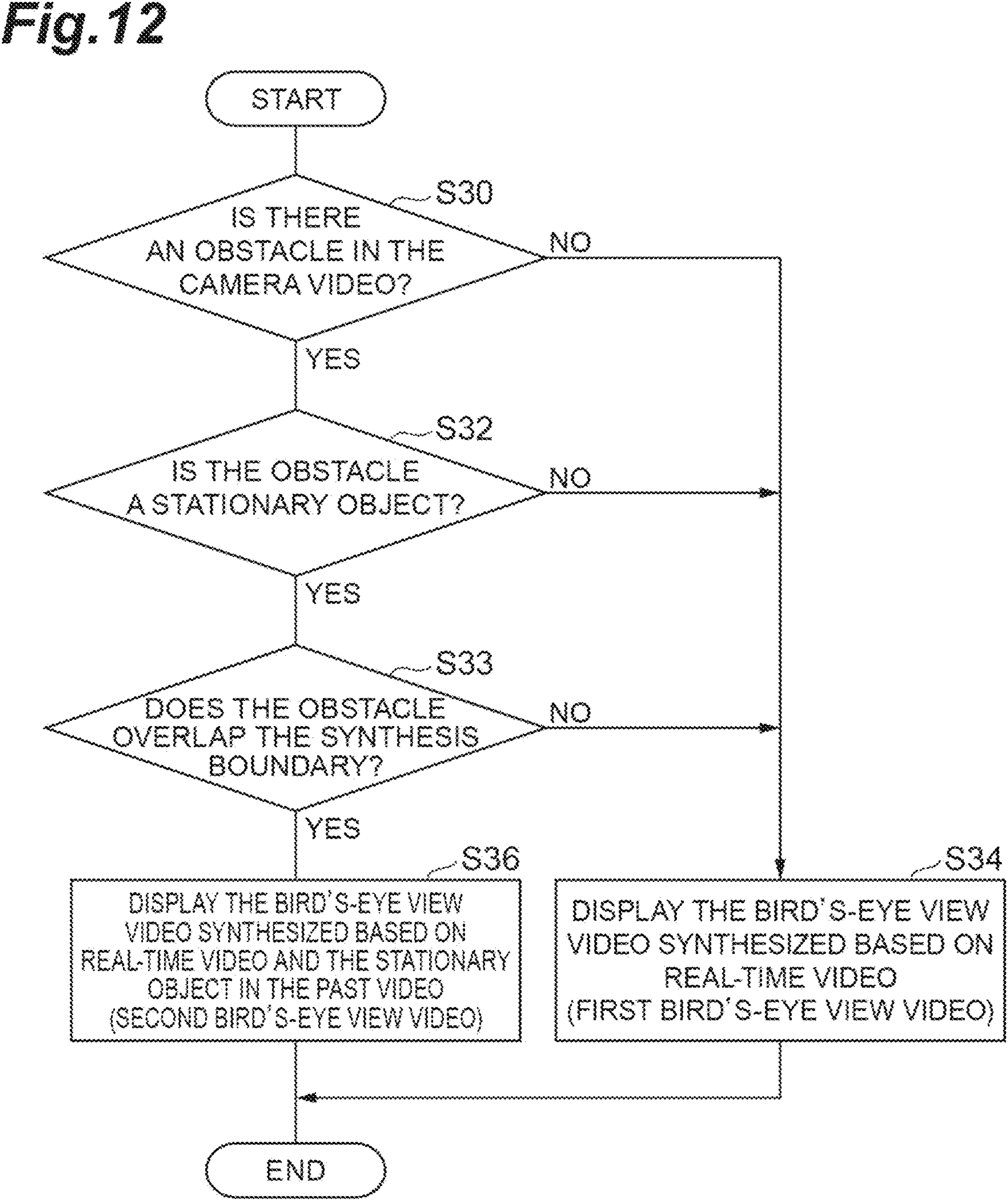
FIG. 12 is a flowchart illustrating an operation of the video display device according to the modified example.

FIG. 12 is a flowchart illustrating an operation of the video display device according to the modified example. The flowchart illustrated in FIG. 12 is executed by the control unit 14 at a timing when, for example, a driver operation is received.

As illustrated in FIG. 12, the control unit 14 determines whether or not obstacle is present in camera video in step S30. This determination is the same as step S10.

When it is determined that the obstacle presents in the camera video (step S30: YES), the control unit 14 determines whether or not the obstacle is a stationary object in step S32. This determination is the same as step S22.

When it is determined that the obstacle is a stationary object (step S32: YES), the control unit 14 determines whether or not the obstacle overlaps the synthesis boundary in step S33. The control unit 14 calculates the display position of the stationary object from the imaging results of the plurality of cameras 10, and determines whether or not the display position overlaps the synthesis boundary.

When it is determined that the obstacle does not present in the camera video (step S30: NO), when it is determined that the obstacle is not a stationary object (step S32: NO), or when it is determined that the obstacle does not overlap with the synthesis boundary (step S33: NO), the control unit 14 selects real-time video as a video serving as a synthesis target in step S34. The control unit 14 then causes the display unit 15 to display the first bird's-eye view video.

When it is determined that the obstacle overlaps with the synthesis boundary (step S33: YES), the control unit 14 selects the real-time video and the past video as the video serving as the synthesis target in step S36. Then, the control unit 14 generates the stationary object image OB30 overlapping with the synthesis boundary based on the past video while creating the first bird's-eye view video based on the real-time video. The control unit 14 displays, in the display unit 15, the second bird's-eye view video GR8 in which the stationary object image OB30 is synthesized with the first bird's-eye view video (see FIG. 11B). When step S34 or step S36 has ended, the flowchart ends. The flowchart is repeatedly executed until a driver operation for termination is received.

As described above, the video display device can suppress disappearance or duplication of a stationary object while appropriately displaying a moving object in real-time. Note that the video display device may use the presence or absence of a moving object as an additional condition for generating the second bird's-eye view video. That is, the video display device may be configured to generate the second bird's-eye view video when both the moving object and the stationary object are present within the imaging range of the plurality of cameras 10. In addition, when it is determined that the obstacle does not present in the camera video (step S30: NO), the second bird's-eye view video based on only the past video may be displayed.

[Display According to Traveling State of Vehicle]

The control unit 14 may select an image to be synthesized based on the traveling state of the vehicle, and output a bird's-eye view video obtained by synthesizing the selected image. The control unit 14 differentiates the traveling state of the vehicle 2 into two states: "stopped state" and "moving state". "Moving state" includes "forward state", "reverse state", "right-turning state", and "left-turning state". When the traveling state of the vehicle 2 is "moving state", the control unit 14 generates an area ahead of the travel direction of the vehicle 2 in the second bird's-eye view video based on the real-time video showing ahead of travel direction of the vehicle 2, and generates an area behind the travel direction of the vehicle 2 in the second bird's-eye view video based on the past video showing behind the travel direction of the vehicle 2. That is, the control unit 14 sets the bird's-eye view video based on the real-time video for the area to be traveled, and sets the bird's-eye view video based on the past video for the area already traveled.

FIGS. 13A and 13B are examples of a surrounding environment of a vehicle, and FIG. 13C is an example of a bird's-eye view video corresponding to the surrounding environment shown in FIG. 13B. As shown in the order of FIGS. 13A and 13B, it is assumed that the vehicle 2 is moving forward. In this case, as illustrated in FIG. 13C, the control unit 14 generates the front area AR1 of the second bird's-eye view video GR9 (an area ahead of the travel direction in the vehicle 2) based on the real-time video that captures the forward direction of the vehicle 2. Then, the control unit 14 generates the rear area AR4 (an area behind the travel direction in the vehicle 2) of the second bird's-eye view video based on the past video that captures the backward direction of the vehicle 2. As a result, only the rear area AR4 becomes an area PS6 based on past video.

FIG. 14 is a flowchart illustrating an operation of the video display device according to the modified example. The flowchart illustrated in FIG. 14 is executed by the control unit 14, for example, at the timing when a driver operation is received.

As shown in FIG. 14, in step S40, the control unit 14 determines whether the traveling state of the vehicle 2 is a stopped state. The control unit 14 determines the traveling state of the vehicle 2 based on the movements of the plurality of cameras 10 or the detection results of the internal sensor 13.

When it is determined that the vehicle 2 is in a stopped state (step S40: YES), the control unit 14 displays the first bird's-eye view video synthesized with the real-time video. The control unit 14 may display a second bird's-eye view video in which only the past video is synthesized.

When it is determined that the traveling state of the vehicle 2 is not a stopped state (step S40: NO), the control unit 14 determines whether or not the traveling state of the vehicle 2 is a forward state in step S44. When it is determined that the traveling state in the vehicle 2 is a forward state (step S44: YES), the control unit 14 selects real-time video and past video as videos to be synthesized in step S46. Then, the control unit 14 generates the bird's-eye view video based on the past video behind the vehicle while creating the first bird's-eye view video based on the real-time video. The control unit 14 causes the display unit 15 to display the second bird's-eye view video GR9 obtained by synthesizing the bird's-eye view video behind the vehicle with the first bird's-eye view video (see FIG. 13C).

When it is determined that the traveling state of the vehicle 2 is not a forward state (step S44: NO), the control unit 14 determines whether or not the traveling state of the vehicle 2 is a reverse state in step S48. When it is determined that the traveling state of the vehicle 2 is a reverse state (step S48: YES), the control unit 14 selects real-time video and past video as videos to be synthesized in step S50. Then, the control unit 14 generates the first bird's-eye view video based on the real-time video, and generates the bird's-eye view video based on the past video ahead of the vehicle 2. The control unit 14 causes the display unit 15 to display the second bird's-eye view video GR9 obtained by synthesizing the bird's-eye view video ahead of the vehicle with the first bird's-eye view video.

When it is determined that the traveling state of the vehicle 2 is not a reverse state (step S48: NO), the control unit 14 determines whether or not the traveling state of the vehicle 2 is a right-turning state in step S52. When it is determined that the traveling state in the vehicle 2 is a right-turning state (step S52: YES), the control unit 14 selects real-time video and past video as videos to be synthesized in step S54. Then, the control unit 14 generates the first bird's-eye view video based on the real-time video, and generates the bird's-eye view video based on the past video of the vehicle left-side based on the past video. The control unit 14 causes the display unit 15 to display the second bird's-eye view video GR9 obtained by synthesizing the bird's-eye view video of the vehicle left-side with the first bird's-eye view video.

When it is determined that the traveling state of the vehicle 2 is not a right-turning state (step S48: NO), the traveling state of the vehicle 2 is a left-turning state. The control unit 14 selects real-time video and past video as videos to be synthesis targets in step S56. Then, the control unit 14 creates the first bird's-eye view video based on the real-time video, and generates the bird's-eye view video based on the past video of the vehicle right side based on the past video. The control unit 14 causes the display unit 15 to display the second bird's-eye view video GR9 obtained by synthesizing the bird's-eye view video of the vehicle right side with the first bird's-eye view video.

When step S42, step S46, step S50, step S54, or step S56 has completed, the flowchart ends. The flowchart is repeatedly executed until a driver operation for termination is received. The video display device can respond to an environmental change by displaying the travel direction to which the most attention should be paid using real-time video, and can suppress the disappearance or duplication of an object by displaying behind the travel direction, which has lower importance than the travel direction, using past video.

The present disclosure also includes the following clauses:

Clause 1

A video display device comprising:

a camera configured to capture video of surroundings of a vehicle;

a storage unit configured to store the video captured by the camera as past video;

a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected; and a display unit configured to display the bird's-eye view video output by the control unit.

Clause 2

The video display device according to clause 1, wherein the control unit outputs any one of first bird's-eye view video obtained by synthesizing the real-time video and second bird's-eye view video obtained by synthesizing at least the past video based on the situation around the vehicle, or outputs the second bird's-eye view video based on the traveling state of the vehicle.

Clause 3

The video display device according to clause 2, wherein the control unit outputs the first bird's-eye view video when a moving object presents within an imaging range of the camera, and outputs the second bird's-eye view video obtained by synthesizing the past video when the moving object does not present within the imaging range of the camera.

Clause 4

The video display device according to clause 2 or 3, further comprising a plurality of cameras including the camera, wherein the storage unit stores the past video captured by the plurality of cameras, and the control unit generates the first bird's-eye view video by synthesizing the real-time video captured by the plurality of cameras, and generates the second bird's-eye view video by synthesizing the past video, or by synthesizing the past video and the real-time video.

Clause 5

The video display device according to clause 4, wherein the control unit outputs the second bird's-eye view video, the second bird's-eye view video obtained by synthesizing the bird's-eye view video of a stationary object based on the past video with the first bird's-eye view video, in a case where the stationary object presents within an imaging range of the plurality of cameras.

Clause 6

The video display device according to clause 4, wherein the control unit outputs the second bird's-eye view video, the second bird's-eye view video obtained by synthesizing the bird's-eye view video of a stationary object based on the past video with the first bird's-eye view video, in a case where the stationary object presents within an imaging range of the plurality of cameras and a display position of the stationary object overlaps with a synthesis boundary of the bird's-eye view video.

Clause 7

The video display device according to any one of clauses 1 to 4, wherein, when the traveling state of the vehicle is a moving state, the control unit generates an area ahead of travel direction of the vehicle in the second bird's-eye view video based on the real-time video representing ahead of the travel direction of the vehicle, and generates an area behind the travel direction of the vehicle in the second bird's-eye view video based on the past video representing behind the travel direction of the vehicle.

What is claimed is:

1. A video display device comprising:

a camera configured to capture video of surroundings of a vehicle;

a storage unit configured to store the video captured by the camera as past video;

a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected, and the bird's-eye view video includes an icon indicating the vehicle, wherein the control unit outputs any one of first bird's-eye view video obtained by synthesizing the real-time video and second bird's-eye view video obtained by synthesizing at least the past video based on the situation around the vehicle, or outputs the second bird's-eye view video based on the traveling state of the vehicle;

a display unit configured to display the bird's-eye view video output by the control unit; and a plurality of cameras including the camera, wherein the storage unit stores the past video captured by the plurality of cameras, and the control unit generates the first bird's-eye view video by synthesizing the real-time video captured by the plurality of cameras, and generates the second bird's-eye view video by synthesizing the past video, or by synthesizing the past video and the real-time video, wherein, when the traveling state of the vehicle is a moving state, the control unit generates an area ahead of travel direction of the vehicle in the second bird's-eye view video based on the real-time video representing ahead of the travel direction of the vehicle, and generates an area behind the travel direction of the vehicle in the second bird's-eye view video based on the past video representing behind the travel direction of the vehicle.

2. The video display device according to claim 1, wherein the control unit outputs the first bird's-eye view video when a moving object presents within an imaging range of the camera, and outputs the second bird's-eye view video obtained by synthesizing the past video when the moving object does not present within the imaging range of the camera.

3. The video display device according to claim 1, wherein the control unit outputs the second bird's-eye view video, which is obtained by synthesizing the bird's-eye view video of a stationary object based on the past video with the first bird's-eye view video, in a case where the stationary object presents within an imaging range of the plurality of cameras.

4. The video display device according to claim 1, wherein the control unit outputs the second bird's-eye view video, which is obtained by synthesizing the bird's-eye view video of a stationary object based on the past video with the first bird's-eye view video, in a case where the stationary object presents within an imaging range of the plurality of cameras and a display position of the stationary object overlaps with a synthesis boundary of the bird's-eye view video.

5. A video display device comprising:

a camera configured to capture video of surroundings of a vehicle;

a storage unit configured to store the video captured by the camera as past video;

a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected; and a display unit configured to display the bird's-eye view video output by the control unit, wherein the control unit outputs any one of first bird's-eye view video obtained by synthesizing the real-time video and second bird's-eye view video obtained by synthesizing at least the past video based on the situation around the vehicle, or outputs the second bird's-eye view video based on the traveling state of the vehicle, and the control unit outputs the first bird's-eye view video when a moving object presents within an imaging range of the camera, and outputs the second bird's-eye view video obtained by synthesizing the past video when the moving object does not present within the imaging range of the camera.

6. A video display device comprising:

a plurality of cameras including a camera configured to capture video of surroundings of a vehicle;

a storage unit configured to store the video captured by the camera as past video;

a control unit configured to select video to be synthesized from real-time video captured by the camera and the past video stored in the storage unit based on a situation around the vehicle or a traveling state of the vehicle, and output bird's-eye view video looking down at the vehicle from a viewpoint above the vehicle, the bird's-eye view video being obtained by synthesizing the video selected; and a display unit configured to display the bird's-eye view video output by the control unit, wherein the control unit outputs any one of first bird's-eye view video obtained by synthesizing the real-time video and second bird's-eye view video obtained by synthesizing at least the past video based on the situation around the vehicle, or outputs the second bird's-eye view video based on the traveling state of the vehicle, the storage unit stores the past video captured by the plurality of cameras, and the control unit generates the first bird's-eye view video by synthesizing the real-time video captured by the plurality of cameras, and generates the second bird's-eye view video by synthesizing the past video, or by synthesizing the past video and the real-time video, and the control unit outputs the second bird's-eye view video, which is obtained by synthesizing the bird's-eye view video of a stationary object based on the past video with the first bird's-eye view video, in a case where the stationary object presents within an imaging range of the plurality of cameras and a display position of the stationary object overlaps with a synthesis boundary of the bird's-eye view video.

* * * * *